United States Patent
Mudd et al.

(10) Patent No.: US 10,704,936 B2
(45) Date of Patent: Jul. 7, 2020

(54) FLOW RATE CHARACTERISTIC FUNCTION IDENTIFICATION METHOD, FLOW RATE CHARACTERISTIC FUNCTION IDENTIFICATION DEVICE, STORAGE MEDIUM STORING FLOW RATE CHARACTERISTIC FUNCTION IDENTIFICATION PROGRAM, AND FLOW RATE SENSOR OR FLOW RATE CONTROL DEVICE USING THEM

(71) Applicant: HORIBA STEC, Co., Ltd., Kyoto-shi, Kyoto (JP)

(72) Inventors: Daniel Thomas Mudd, Reno, NV (US); William Wylie White, Sparks, NV (US); Michael Kramer, Sparks, NV (US); Tadahiro Yasuda, Reno, NV (US)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 260 days.

(21) Appl. No.: 15/837,931

(22) Filed: Dec. 11, 2017

(65) Prior Publication Data
US 2018/0164135 A1    Jun. 14, 2018

(30) Foreign Application Priority Data
Dec. 13, 2016 (JP) ................... 2016-241702

(51) Int. Cl.
*G01F 1/36* (2006.01)
*G01F 1/50* (2006.01)
(Continued)

(52) U.S. Cl.
CPC ............... *G01F 1/36* (2013.01); *G01F 1/363* (2013.01); *G01F 1/40* (2013.01); *G01F 1/50* (2013.01); *G01F 25/0007* (2013.01)

(58) Field of Classification Search
CPC ....................................................... G01F 1/36
See application file for complete search history.

(56) References Cited

U.S. PATENT DOCUMENTS

| | | | |
|---|---|---|---|
| 2013/0153040 A1* | 6/2013 | Goto | G01F 1/6847 137/8 |
| 2014/0076424 A1* | 3/2014 | Takijiri | G05D 7/0617 137/486 |

(Continued)

FOREIGN PATENT DOCUMENTS

JP    2010216807 A    9/2010

*Primary Examiner* — Raymond L Nimox
(74) *Attorney, Agent, or Firm* — Alleman Hall Creasman & Tuttle LLP (57) ABSTRACT

To provide a flow rate characteristic function identification method, flow rate sensor, and flow rate characteristic function identification program that can set a flow rate characteristic function reflecting not only the type or shape of a fluid resistance but also the effects of states such as an attachment state of the fluid resistance, and calculate a flow rate with higher accuracy. An actual flow rate characteristic function, which is a flow rate characteristic function when an actual fluid resistance is provided in a flow path, is identified on the basis of multiple flow rate characteristic functions including a first reference flow rate characteristic function and a second reference flow rate characteristic function, and predetermined weighting.

7 Claims, 7 Drawing Sheets

(51) Int. Cl.
*G01F 1/40* (2006.01)
*G01F 25/00* (2006.01)

(56) References Cited

U.S. PATENT DOCUMENTS

2014/0083159 A1* 3/2014 Nagai ................. G01F 25/0053
                                                  73/1.34
2016/0124440 A1* 5/2016 Takijiri ................ G05D 7/0635
                                                  137/455

* cited by examiner

FLOW RATE CHARACTERISTIC FUNCTION IDENTIFICATION METHOD, FLOW RATE CHARACTERISTIC FUNCTION IDENTIFICATION DEVICE, STORAGE MEDIUM STORING FLOW RATE CHARACTERISTIC FUNCTION IDENTIFICATION PROGRAM, AND FLOW RATE SENSOR OR FLOW RATE CONTROL DEVICE USING THEM

TECHNICAL FIELD

The present invention relates to a method to identify a flow rate characteristic function for calculating a flow rate value from an output value indicated by an output signal outputted from an output mechanism, and a device using the identification method.

BACKGROUND ART

A flow rate sensor is configured to include: for example, an output mechanism that is configured to output an output signal such as a voltage corresponding to a flow rate of fluid flowing through a flow path; and a flow rate calculation part that is configured to calculate the flow rate on the basis of an output value indicated by the output signal and a flow rate characteristic function using the output value as an input variable.

The flow rate characteristic function has specific functional characteristics determined depending on the type or shape of a fluid resistance provided in the flow path, such as a laminar flow element, and for example, between a fluid resistance having a linear resistive flow path and a fluid resistance having a curved resistive flow path, the degree of the flow rate characteristic function, the tendency of a graph shape, and the like are significantly different.

CITATION LIST

Patent Literature

Patent Literature 1: Japanese Unexamined Patent Publication JA-A2010-216807

SUMMARY OF INVENTION

Technical Problem

For this reason, it can also be assumed that by setting a flow rate characteristic function corresponding to the type or shape of the fluid resistance provided in the flow path in the flow rate calculation part, an accurate flow rate can be calculated.

However, even when using the flow rate characteristic function corresponding to the type or shape of the fluid resistance, a flow rate of the fluid actually flowing through the flow path cannot be always calculated. As a result of intensive examination of this problem, the present inventors have found that an instrumental error occurs in the flow rate characteristic function due to causes such as the fluid resistance not necessarily provided with respect to the flow path in accordance with design, and a conventional flow rate characteristic function setting method generalized for each type or shape of a fluid resistance makes it difficult to calculate a flow rate with high accuracy.

The present invention is made in consideration of the problem as described above, and intends to provide a flow rate characteristic function identification method, flow rate characteristic function identification device, and flow rate characteristic function identification program that can set a flow rate characteristic function reflecting not only the type or shape of a fluid resistance but also the effects of states such as an attachment state of the fluid resistance, and calculate a flow rate with higher accuracy.

Solution to Problem

That is, the flow rate characteristic function identification method of the present invention is a method to identify a actual flow rate characteristic function used in a flow rate sensor including: an output mechanism that is configured to output an output signal corresponding to a flow rate of fluid flowing through a flow path; an actual fluid resistance that is actually provided in the flow path; and a flow rate calculation part that is configured to calculate the flow rate on the basis of an output value indicated by the output signal and the actual flow rate characteristic function determined by the characteristics of the actual fluid resistance, and includes: acquiring a first reference flow rate characteristic function and a second reference flow rate characteristic function, wherein the first reference flow rate characteristic function is determined by a characteristic of a first reference fluid resistance; the second reference flow rate characteristic function is determined by a characteristic of a second reference fluid resistance; and identifying the actual flow rate characteristic function on the basis of multiple flow rate characteristic functions including the first reference flow rate characteristic function and the second reference flow rate characteristic function, and predetermined weighting.

Also, the flow rate characteristic function identification device of the present invention is a flow rate characteristic function identification device adapted to identify an actual flow rate characteristic function used in a flow rate sensor including: an output mechanism that is configured to output an output signal corresponding to a flow rate of fluid flowing through a flow path; an actual fluid resistance that is a fluid resistance actually provided in the flow path; and a flow rate calculation part that is configured to calculate the flow rate on the basis of an output value indicated by the output signal and the actual flow rate characteristic function determined by the characteristics of the actual fluid resistance, and includes: a reference flow rate characteristic function acquisition part that is configured to acquire a first reference flow rate characteristic function and a second reference flow rate characteristic function, wherein the first reference flow rate characteristic function is determined by a characteristic of a first reference fluid resistance; the second reference flow rate characteristic function is determined by a characteristic of a second reference fluid resistance; and an actual flow rate characteristic function identification part that is configured to identify the actual flow rate characteristic function on the basis of the first reference flow rate characteristic function, the second reference flow rate characteristic function, and predetermined weighting.

Here, "determined by the characteristics of a fluid resistance" means that a flow rate characteristic function is affected by the shape or the like of a resistive flow path. Also, the first reference flow rate characteristic function and the second reference flow rate characteristic function may be identified by providing the first reference fluid resistance and the second reference fluid resistance in a flow path different from the above-described flow path, or by providing the first reference fluid resistance and the second reference fluid resistance in the above-described flow path in place of the actual fluid resistance, respectively.

In such a configuration, since the actual flow rate characteristic function is identified on the basis of the first and second reference flow rate characteristic functions, which are different in characteristics from each other, and the predetermined weighting, the actual flow rate characteristic function that reflects not only the type or shape of the actual fluid resistance provided in the flow path but also an instrumental difference such as how to provide the actual fluid resistance and is therefore unique can be identified.

Accordingly, the actual flow rate characteristic function used to calculate the flow rate can be made, for example, specific and accurate for each flow rate sensor, making it possible to accurately output the flow rate with the error between the calculated flow rate and an actual flow rate made very small.

More specifically, even in the case where the fluid resistance having, for example, a linear resistive flow path exhibits the characteristics of a fluid resistance partially having a curved resistive flow path due to how to provide the actual fluid resistance in the flow path, the actual flow rate characteristic function taking into consideration the characteristics of them is identified, and therefore it can be considered that the flow rate characteristic function, which is more accurate, is calculated.

In order to make it possible to determine the weighting between the first reference flow rate characteristic function and the second reference flow rate characteristic function in a simple manner, and accurately identify the actual flow rate characteristic function, it is only necessary that the actual flow rate characteristic function is a function using the output value as an input variable, and the actual flow rate characteristic function identification part includes: a sample data storage part that is configured to store one or more pieces of sample data each including the output value of the output signal in the case where the actual fluid resistance is provided in the flow path and an actual measured value of an output variable of the actual flow rate characteristic function, which corresponds to the output value, as a pair; a mixing ratio determination part that on the basis of the pieces of sample data, is configured to determine the weighting between the first reference flow rate characteristic function and the second reference flow rate characteristic function at each output value; and a function calculation part that is configured to calculate the actual flow rate characteristic function by obtaining a weighted mean on the basis of the first reference flow rate characteristic function, the second reference flow rate characteristic function, and the weighting determined by the mixing ratio determination part.

Specific examples of the actual flow rate characteristic function accurately identifiable by the identification method of the present invention include an example where the actual flow rate characteristic function is a function that uses the output value indicated by the output signal as an input variable and as an output variable, a conversion factor that is a flow rate correction factor depending on a fluid type.

In order to make it possible to measure the flow rate more accurately than before, it is only necessary that the flow rate sensor is configured such that the flow rate calculation part uses the actual flow rate characteristic function identified by the flow rate characteristic function identification device.

In order to make it possible to perform accurate flow rate control to obtain a desired flow rate on the basis of the flow rate accurately measured by using the actual flow rate characteristic function identified by the flow rate characteristic function identification device, it is only necessary that a flow rate control device includes: the flow rate sensor; a valve provided in the flow path; and a flow rate control part that is configured to control an opening level of the valve so as to minimize the deviation between a measured flow rate value, which is the flow rate of the fluid and outputted from the flow rate sensor, and a set setting flow rate value.

In order to make it possible to identify an accurate flow rate characteristic function taking into consideration various states such as a setting state of a fluid resistance in an existing flow rate sensor or flow rate control device, and perform flow rate measurement or flow rate control with higher accuracy, it is only necessary to, in the existing device, install a flow rate characteristic function identification program that is adapted to identify an actual flow rate characteristic function used in a flow rate sensor including: an output mechanism that is configured to output an output signal corresponding to a flow rate of fluid flowing through a flow path; an actual fluid resistance that is actually provided in the flow path; and a flow rate calculation part that is configured to calculate the flow rate on the basis of an output value indicated by the output signal and the actual flow rate characteristic function determined by the characteristics of the actual fluid resistance, and instructs a computer to fulfill functions as: a reference flow rate characteristic function acquisition part that is configured to acquire a first reference flow rate characteristic function and a second reference flow rate characteristic function determined, wherein the first reference flow rate characteristic function is determined by a characteristic of a first reference fluid resistance; the second reference flow rate characteristic function is determined by a characteristic of a second reference fluid resistance; and an actual flow rate characteristic function identification part that is configured to identify the actual flow rate characteristic function on the basis of the first reference flow rate characteristic function, the second reference flow rate characteristic function, and predetermined weighting.

Advantageous Effects of Invention

As described, since the flow rate characteristic function identification method and the like of the present invention identify the actual flow rate characteristic function on the basis of the first reference flow rate characteristic function, the second reference flow rate characteristic function, and the predetermined weighting, the actual flow rate characteristic function that can reflect not only the type or shape of the actual fluid resistance provided in the flow path but also various states such as a setting state and is therefore closer to an actual state can be obtained. As a result, the effect of an instrumental error specific to each flow rate sensor can be substantially eliminated to calculate a flow rate with high accuracy.

DESCRIPTION OF EMBODIMENTS

A flow rate sensor 10, flow rate control device 100, and flow rate characteristic function identification device 6 according to one embodiment of the present invention will be described with reference to drawings.

Figure 1:
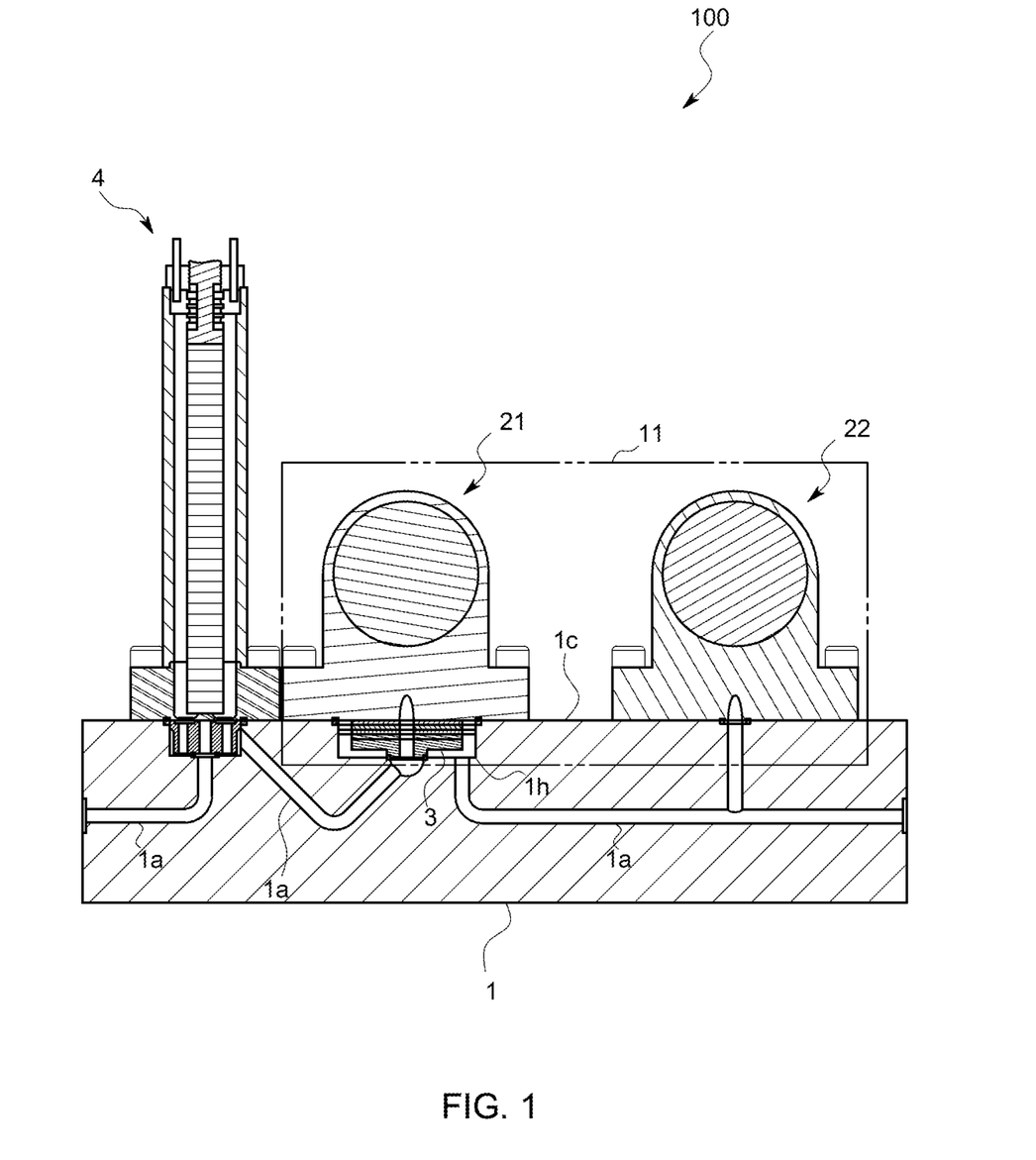
FIG. 1 is a schematic diagram illustrating a flow rate sensor and a flow rate control device according to one embodiment of the present invention.
Figure 2:
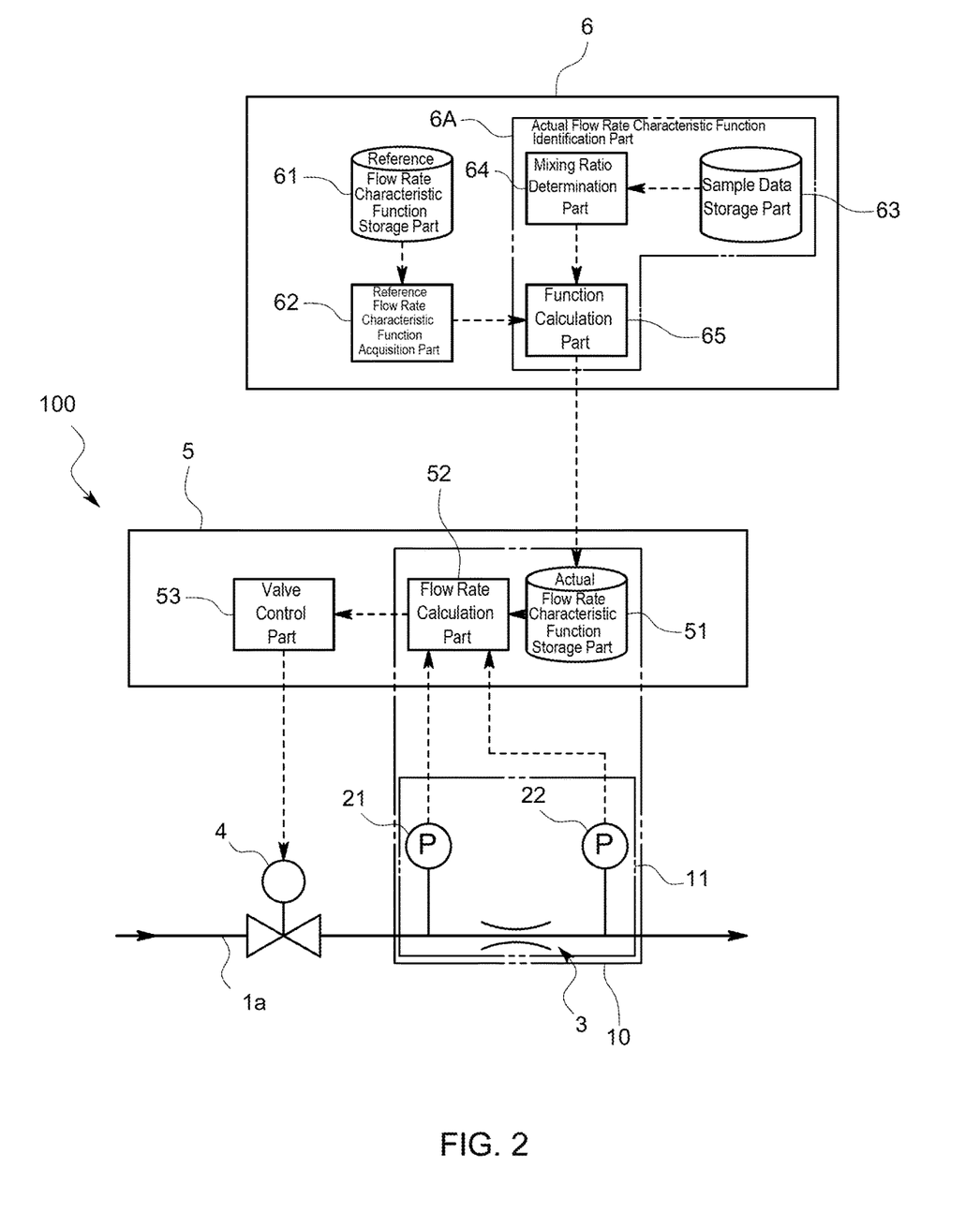
FIG. 2 is a schematic functional block diagram illustrating the flow rate characteristic function identification device, flow rate sensor, and flow rate control device in the same embodiment.

As illustrated in FIGS. 1 and 2, the flow rate control device 100 in the present embodiment is configured to include: a body 1 in which an internal flow path 1a is formed; a valve 4 and an output mechanism 11 that are attached on a component attachment surface 1c, which is the upper surface of the body 1; and a control mechanism 5 having at least a function that on the basis of a value indicated by an output signal from the output mechanism 11, calculates a flow rate of fluid flowing through the internal flow path 1a, and on the basis of the calculated flow rate value, controls an opening level of the valve 4. As will be described later, the flow rate control device 100 in the present embodiment is configured as a pressure type mass flow controller so as to calculate the flow rate on the basis of the pressure of the fluid, and perform flow rate control.

The valve 4 is, for example, a solenoid valve or a piezo valve, of which the opening level is controlled by the control mechanism 5 on the basis of the deviation between the measured flow rate value calculated on the basis of the output from the output mechanism 11 and a setting flow rate value set by a user.

The output mechanism 11 is one that is configured to output the output signal corresponding to the flow rate of the fluid flowing through the internal flow path 1a. Further, it is configured that the output mechanism 11 as a hardware part and a flow rate calculation part 52 as a software part configured in the control mechanism 5 cooperate to thereby fulfill a function as the flow rate sensor 10.

More specifically, the output mechanism 11 is one including: a laminar flow element 3 as an actual fluid resistance that is provided in a concave part 1h, which is provided so as to open on the outer surface, so as to divide the internal flow path 1a of the body 1; and upstream and downstream side pressure sensors 21 and 22 that are respectively provided on the upstream and downstream sides of the laminar flow element 3 and as output signals, output pressure values changing depending on the flow rate of the fluid. As will be described later, the control mechanism 5 is configured to, on the basis of the pressure value outputted from the upstream side pressure sensor 21 or the downstream side pressure sensor 22, and a flow rate characteristic function using the pressure value as an input variable, calculate the flow rate of the fluid flowing through the internal flow path 1a.

Next, the laminar flow element 3 as an actual fluid resistance will be described in detail. The laminar flow element 3 is adapted to be held under pressure between the bottom surface of the upstream side pressure sensor 21 and the bottom surface of the concave part 1h by attaching the upstream side pressure sensor 21 on the component attachment surface 1c in a state where the laminar flow element 3 is contained in the concave part 1h provided so as to divide the internal flow path 1a halfway. In the laminar flow element 3, for example, linear resistive flow paths are formed substantially parallel to a flow path direction of the internal flow path 1a. Also, the laminar flow element 3 is one that characterizes an actual flow rate characteristic function providing the relationship between the output value of the output signal from the output mechanism 11 and the flow rate. More specifically, the actual flow rate characteristic function gives a value basically determined by the characteristics of the laminar flow element 3 as an actual fluid resistance provided in the internal flow path 1a, such as a length L of the resistive flow path or a representative dimension D that depends on a cross sectional shape of the resistive flow path, and is further affected by other characteristics. In this embodiment, the representative dimension D is defined as hydraulic diameter, the hydraulic diameter. Note that the hydraulic diameter is a function of the cross sectional area of the resistive flow path and the wetted perimeter of the resistive flow path. Thus, the hydraulic diameter D is expressed as equation D=4A/P, where A is the cross sectional area and P is wetted perimeter. In addition, the hydraulic diameter D can be approximately defined as the twice value of the shortest dimension in cross sectional of the resistive flow path. Therefore, instead of using the hydraulic diameter, twice of the thickness of the cross sectional shape of the resistive flow path can be approximately used as representative dimension D. The actual flow rate characteristic function specific to each instrument will be given due to some factors such as a press holding state of the laminar flow element 3, a manufacturing error of the laminar flow element 3 itself, and an attachment state of the laminar flow element 3 with respect to the concave part 1h.

Next, the control mechanism 5 will be described.

The control mechanism 5 is a so-called computer including a CPU, memory, A/D and D/A converters, input/output means, and the like, and configured to fulfill functions as at least an actual flow rate characteristic function storage part 51, the flow rate calculation part 52, and a valve control part 53 by executing a flow rate control program stored in the memory.

The actual flow rate characteristic function storage part 51 is one that is configured to store the actual flow rate characteristic function identified by the below-described flow rate characteristic function identification device 6. The actual flow rate characteristic function is one that is determined by the characteristics of the laminar flow element 3 as an actual fluid resistance provided in the flow path 1a and used to calculate the flow rate in the flow rate calculation part 52.

The flow rate calculation part 52 is one that is configured to calculate the flow rate on the basis of at least the respective pressure values outputted from the upstream side pressure sensor 21 and the downstream side pressure sensor 22, and the actual flow rate characteristic function that is stored in the actual flow rate characteristic function storage part 51 and uses the pressure value P1 outputted from the upstream side pressure sensor 21 as an input variable. More specifically, the flow rate calculation part 52 calculates a base flow rate on the basis of a flow rate calculation base expression (a function obtained by calibrating the flow rate sensor with reference fluid) providing the relationship between each pressure value as the output value from the output mechanism 11 and a flow rate. The flow rate calculation base expression is one that accurately reflects the relationship between each pressure and a flow rate when the reference fluid such as $N_2$ flows. Further, the flow rate calculation part 52 is configured to, when fluid other than the reference fluid such as $N_2$ flows, multiply the base flow rate by a flow rate correction factor, which is called a conversion factor and depends on the type of fluid, and output the resulting value as an actual flow rate.

Note that the conversion factor is affected by not only a fluid type but also the pressure of fluid or the like, and a value of the conversion factor is different among respective pressure values. Therefore, the present embodiment is configured to be able to calculate an accurate flow rate regardless of a fluid type by using the actual flow rate characteristic function using the upstream side pressure value P1 corresponding to the output value of the output mechanism 11 as an input variable and the conversion factor as an output variable. A theoretical or experimental expression representing the conversion factor, i.e., representing the actual flow rate characteristic function can be determined for each type or shape of the laminar flow element 3; however, in practice, the actual flow rate characteristic function deviates from the theoretical or experimental expression and is specific due to some causes such as the difference in the attachment state of the laminar flow element 3. For this reason, the present embodiment is configured such that the below-described actual flow rate characteristic function identification part 6A can identify and use a flow rate characteristic function specific to each flow rate sensor 10 or flow rate control device 100.

The valve control part 53 is one that feedback-controls the opening level of the valve 4 so as to minimize the deviation between the flow rate value calculated in the flow rate calculation part 52 and a preset setting flow rate value.

Next, the flow rate characteristic function identification device 6 will be described. The flow rate characteristic function identification device 6 is a so-called computer including a CPU, memory, A/D and D/A converters, input/output means, and the like, and fulfills functions as at least a reference flow rate characteristic function storage part 61, a reference flow rate characteristic function acquisition part 62, and the actual flow rate characteristic function identification part 6A by executing a flow rate characteristic function identification program stored in the memory.

The reference flow rate characteristic function storage part 61 is one that is configured to store at least a first reference flow rate characteristic function f(P1) determined by the characteristics of a first reference fluid resistance 31 and a second reference flow rate characteristic function g(P1) determined by the characteristics of a second reference fluid resistance 32. The reference flow rate characteristic function storage part 61 may be one that further stores multiple reference flow rate characteristic functions other than the above first and second reference flow rate characteristic functions. Note that the first reference flow rate characteristic function and the second reference flow rate characteristic function may be ones obtained by actually providing the first reference fluid resistance 31 and the second reference fluid resistance 32 in the flow path 1a in place of the laminar flow element 3 and actually measuring a pressure value, a flow rate, and the like at the time, respectively, or obtained from a theoretical expression or the like. Alternatively, the first reference flow rate characteristic function and the second reference flow rate characteristic function may be ones defined by providing the first reference fluid resistance 31 and the second reference fluid resistance 32 in a flow path different from the flow path 1a and performing actual measurement, respectively. In the present embodiment, the first reference flow rate characteristic function and the second reference flow rate characteristic function are functions that use pressures on the upstream sides of the reference fluid resistances 31 and 32 as input variables, and conversion factors as output variables, respectively.

The reference flow rate characteristic function acquisition part 62 is one that from the reference flow rate characteristic function storage part 61, reads and acquires the first reference flow rate characteristic function f(P1) and the second reference flow rate characteristic function g(P1) to be used in the actual flow rate characteristic function identification part 6A.

The actual flow rate characteristic function identification part 6A is one that is configured to identify the actual flow rate characteristic function that reflects various states such as the attachment state of the laminar flow element 3 and is to be used in the flow rate calculation part 52. That is, the actual flow rate characteristic function identification part 6A is configured to identify the actual flow rate characteristic function by obtaining a weighted mean of multiple flow rate characteristic functions including at least the first reference flow rate characteristic function and the second reference flow rate characteristic function stored in the reference flow rate characteristic function storage part 61 in accordance with predetermined weighting.

Figure 3A:
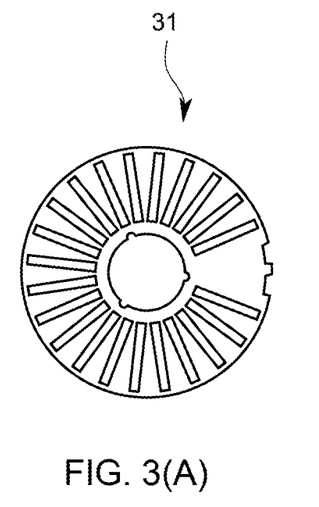
FIGS. 3(A) and 3(B) are diagrams illustrating examples of a reference fluid resistance in the same embodiment.
Figure 3B:
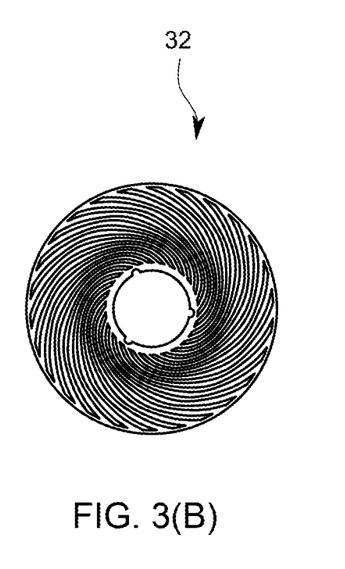
Figure 4:
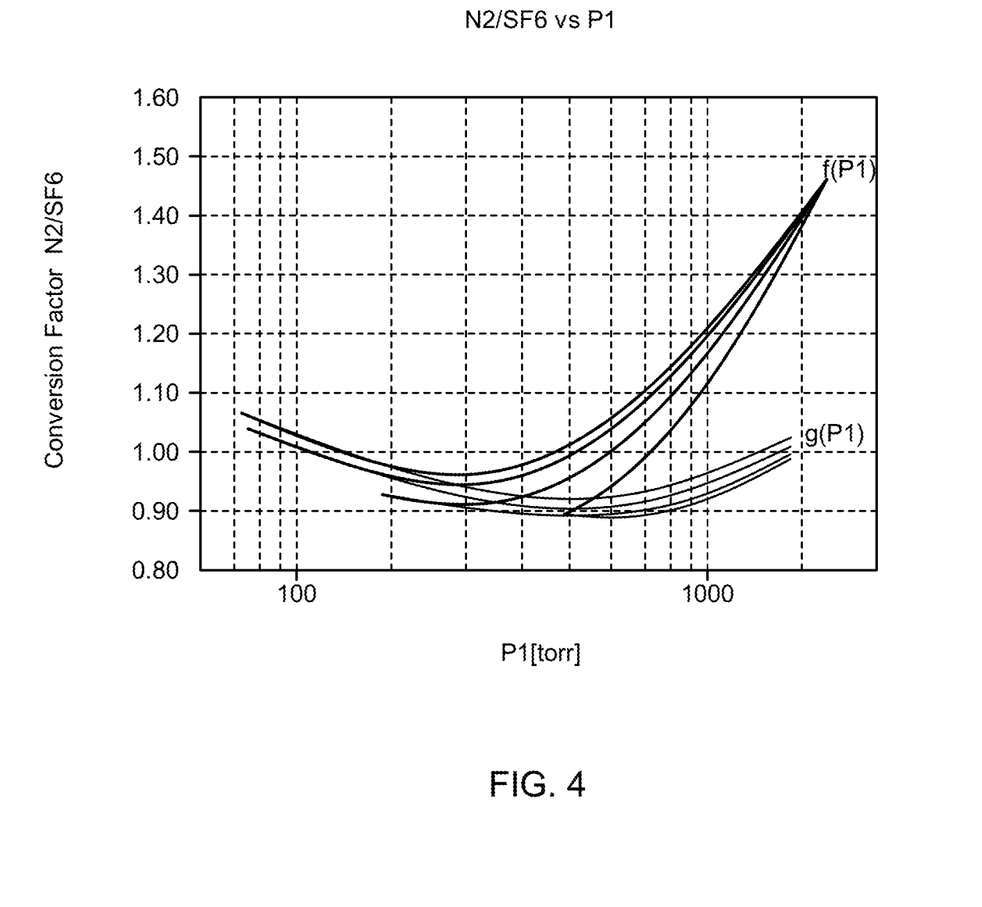
FIG. 4 is a diagram illustrating examples of reference flow rate characteristics in the same embodiment

The respective reference fluid resistances and the respective reference flow rate characteristic functions will be now described. The first reference fluid resistance 31 is a laminar flow element in which, for example, linear resistive flow paths as illustrated in FIG. 3A are radially formed. On the other hand, the second reference fluid resistance 32 is a laminar flow element in which, for example, resistive flow paths as illustrated in FIG. 3B are formed in a curved manner. When the first reference fluid resistance 31 is compared with the second reference fluid resistance 32, the first reference fluid resistance 31 and the second reference fluid resistance 32 has almost same hydraulic diameter D as the representative dimension. On the other hand, the length L of the resistive flow path between the first reference fluid resistance 31 and the second reference fluid resistance 32. Thus, the second reference fluid resistance 32 has longer length L than the first reference fluid resistance 31 because the resistive flow paths of the second reference fluid resistance 32 are formed curved manner. Therefore, concerning L/D that is a proportion of the length L of the resistive flow path to the hydraulic diameter D, the second reference fluid resistance 32 has bigger L/D than the first reference fluid resistance 31. Between the case where the first reference fluid resistance 31 is provided in the flow path 1a and the case where the second reference fluid resistance 32 is provided in the flow path 1a, the characteristics of a flow rate characteristic function representing the relationship between a pressure value and a conversion factor is significantly different. More specifically, as illustrated in FIG. 4, between the first reference flow rate characteristic function f(P1) determined by the characteristics of the first reference fluid resistance 31 and the second reference flow rate characteristic function g(P1) determined by the characteristics of the second reference fluid resistance 32, the change characteristics of a function become more deviated as the upstream side pressure value P1 increases. These reference flow rate characteristic functions can also be represented as functions using the logarithms of the pressure values P1 on the upstream sides of the reference fluid resistances as variables, respectively. Note that the reason why multiple curved lines are illustrated as f(P1) or g(P1) in FIG. 4 is because a pressure value P2 on the downstream side of a corresponding fluid resistance is different. In other words, the curved line f(P1) or g(P2) tends to move downward as the downstream side pressure P2 comes close to vacuum pressure and decreases.

In the present embodiment, since the laminar flow element 3 as an actual fluid resistance has the linear resistive flow paths, the actual flow rate characteristic function is ideally supposed to exhibit behavior close to that of the first reference flow rate characteristic function f(P1). However, a part having characteristics like those of the second reference fluid resistance 32 having the curved resistive flow paths due to various causes such as the attachment state of the laminar flow element 3 is present, and therefore actually, the actual flow rate characteristic function is highly likely to have characteristics between the characteristics of the first reference flow rate characteristic function f(P1) and those of the second reference flow rate characteristic function g(P1). For this reason, in the present embodiment, the actual flow rate characteristic function identification part 6A is adapted to, on the basis of sample data indicating the relationship between the pressure value and conversion factor at the time of providing the laminar flow element 3 as an actual fluid resistance, determine the weighting between the respective reference flow rate characteristic functions, and obtain the weighted mean to identify the actual flow rate characteristic function.

More specifically, the actual flow rate characteristic function identification part 6A is configured to include: a sample data storage part 63 that is configured to store one or more pieces of sample data each including an output value of the output signal outputted from the output mechanism 11 when the laminar flow element 3 as an actual fluid resistance is provided in the flow path 1a and the fluid flows through the flow path 1a at a predetermined flow rate and an actual measured value of the output variable of the flow rate characteristic function, which corresponds to the output value, as a pair; a mixing ratio determination part 64 as a weighting determination part that on the basis of the sample data, is configured to determine the weighting between the first reference flow rate characteristic function f(P1) and the second reference flow rate characteristic function g(P1) at each output value; and a function calculation part 65 that is configured to calculate the actual flow rate characteristic function F(P1) by obtaining an weighted mean on the basis of the first reference flow rate characteristic function f(P1), the second reference flow rate characteristic function g(P1), and the weighting determined in the mixing ratio determination part 64.

In the present embodiment, the sample data storage part 63 stores one set of sample data that as a pair, include a predetermined pressure value and a value of the conversion factor between $N_2$ and $SF_6$ at the time when the laminar flow element 3 as an actual fluid resistance is provided in the flow path 1a and the predetermined pressure value is measured by the upstream side pressure sensor 21. For example, it is only necessary that with use of a flow rate sensor or a pressure control device serving as a reference for calibration, a ratio between output values outputted from the output mechanism 11 when flowing $N_2$ and $SF_6$ under some pressure is obtained to actually measure the conversion factor.

Figure 5:
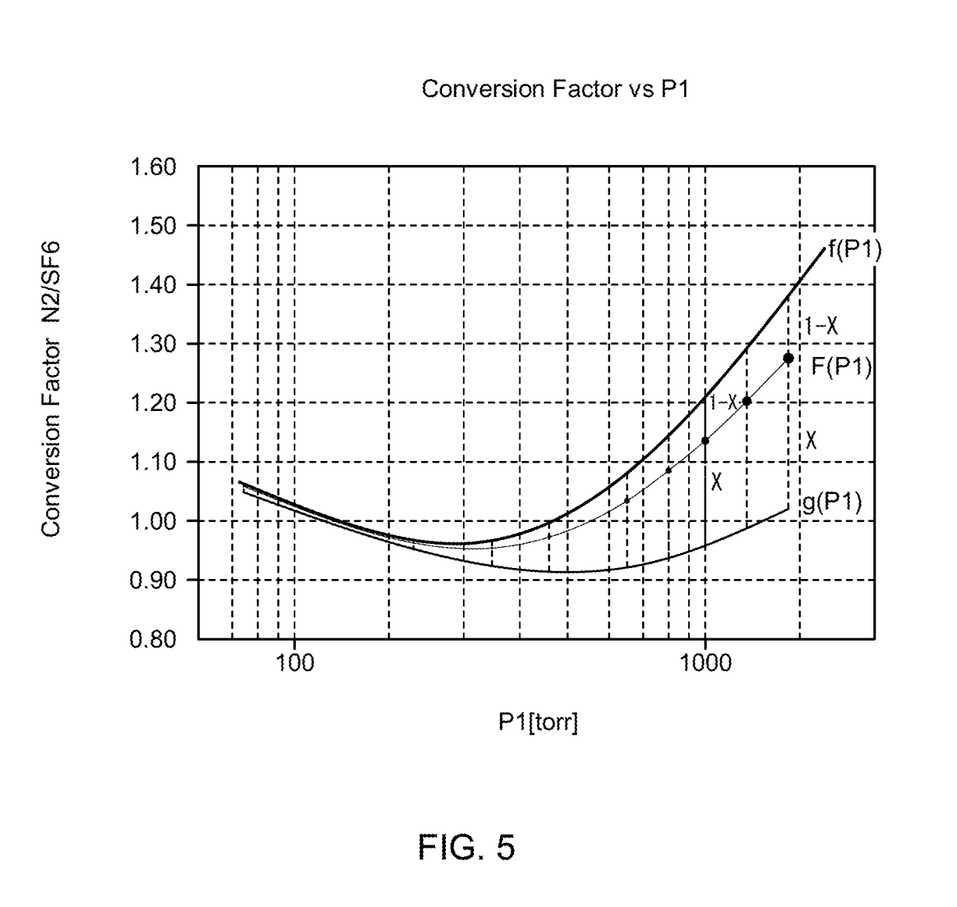
FIG. 5 is a schematic graph illustrating a method for determining weighting in a mixing ratio determination part in the same embodiment.

The mixing ratio determination part 64 is one that is configured to determine the weighting between the first reference flow rate characteristic function f(P1) and the second reference flow rate characteristic function g(P1), i.e., a ratio with which they are mixed. In the present embodiment, as illustrated in FIG. 5, on the assumption that the actual flow rate characteristic function F(P1) is a function internally dividing the respective reference flow rate characteristic functions with a predetermined ratio, a corresponding internal division ratio is obtained on the basis of the pieces of sample data and set as the weighting. For example, as illustrated in FIG. 5, in the case where the upstream side pressure value P1 indicated by sample data is 1000 torr, the internal division ratio (1−X):X is obtained from values of the respective conversion factors at this pressure value, and on the assumption that the same internal division ratio is applicable throughout all pressure values, the internal division ratio is applied. Note that in FIG. 5, for facilitating understanding, the functions in the case of some specific downstream side pressure P2 are illustrated as a typical example. That is, flow rates are actually measured when the upstream side pressure value P1 is 1000 torr and the downstream side pressure P2 has some specific fixed value, and from the conversion factor values at the time, the internal division ratio is calculated.

The function calculation part 65 calculates the actual flow rate characteristic function by adding a function obtained by multiplying the first reference flow rate characteristic function f(P1) by X and a function obtained by multiplying the second reference flow rate characteristic function g(P1) by (1−X). That is, given that the actual flow rate characteristic function is F(P1), the first reference flow rate characteristic function is f(P1), and the second reference flow rate characteristic function is g(P1), the actual flow rate characteristic function F(P1) can be represented as F(P1)=Xf(P1)+(1−X)g(P1). The actual flow rate characteristic function F(P1) calculated by the function calculation part 65 is prepared at the time of, for example, adjustment before factory shipment of the flow rate sensor 10 and the flow rate control device 100, and the calculated actual flow rate characteristic function F(P1) is stored in the actual flow rate characteristic function storage part 51 of the control mechanism 5. After the factory shipment, on the basis of the stored actual flow rate characteristic function F(P1), conversion factors at respective upstream side pressures P1 are calculated in the flow rate calculation part 52, and for example, by multiplying the conversion factors by the base flow rate, flow rates are calculated.

Next, the reason why flow rate measurement accuracy is improved in the case of calculating a flow rate using the actual flow rate characteristic function F(P1) identified by obtaining the weighted mean of the respective reference flow rate characteristic functions in accordance with the predetermined weighting as described will be described on the basis of pieces of actual measured data.

Figure 6A:
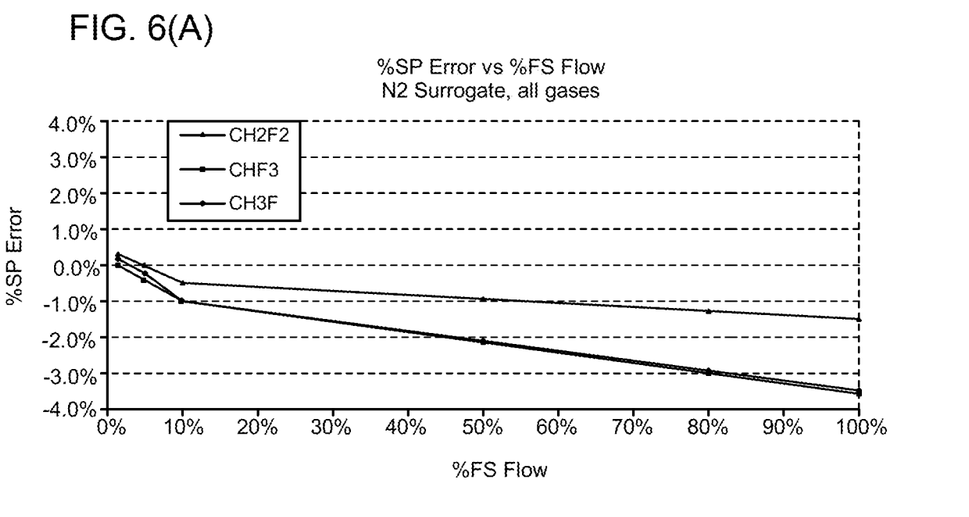
FIGS. 6(A) and 6(B) are schematic graphs illustrating flow rate measurement errors of flow rate sensors according to a conventional technique and the present embodiment.
Figure 6B:
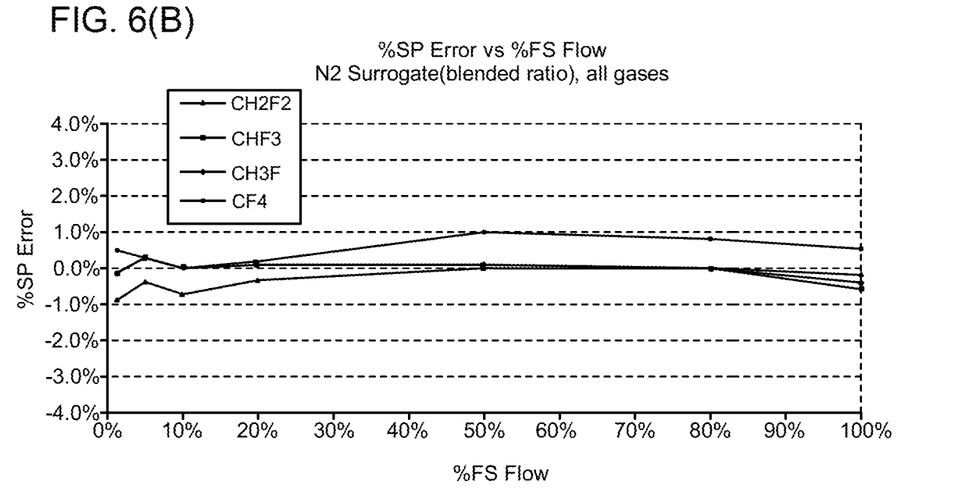

FIG. 6A illustrates a graph of a measurement error at the time of performing flow rate measurement using the first reference flow rate characteristic function as a single flow rate characteristic function in the same manner as before, and FIG. 6B illustrates a graph of a measurement error at the time of performing flow rate measurement using the flow rate sensor 10 in the present embodiment.

As can be seen from FIG. 6A, in the case of the same manner as before, the measurement error tends to increase toward a larger flow rate area; however, as can be seen from FIG. 6B, in the present embodiment, over substantially the entire flow rate area, only mutually comparable measurement errors occur. It also turns out that such a tendency does not depend on a fluid type.

As described, the flow rate sensor 10 and the flow rate control device 100 in the present embodiment can accurately identify, in a simple manner, the actual flow rate characteristic function F(P1) that takes into consideration not only the type or shape of the actual fluid resistance 3 provided in the flow path 1a but also various states such as the attachment state of the actual fluid resistance 3 and is specific to each instrument.

Further, a flow rate can be accurately calculated using the actual flow rate characteristic function F(P1) appropriate for each flow rate sensor 10 and flow rate control device 100, and flow rate control based on the accurate flow rate can be performed.

In addition, when identifying the actual flow rate characteristic function F(P1), without the need to acquire pieces of sample data at a number of points, as long as at least sample data at one point is available, the actual flow rate characteristic function can be identified from the first reference flow rate characteristic function f(P1) and the second reference flow rate characteristic function g(P1), and the number of experiments for the identification can also be reduced to the minimum necessary.

Accordingly, for example, the actual flow rate characteristic function F(P1) can be set differently for each flow rate sensor 10 or each flow rate control device 100, and realized at practical cost without much time and effort for customization.

Other embodiments will be described.

In the above-described embodiment, the input variable and output variable of each flow rate characteristic function are respectively a pressure value and a conversion factor; however, the flow rate characteristic function is not limited to such a function. For example, the input variable may be a voltage value or a current value outputted from the output mechanism, and the output variable may be a flow rate value itself. Also, without limitation to the pressure type flow rate sensor, the present invention may identify a flow rate characteristic function used for a thermal type flow rate sensor. In this case, various configurations can be cited, such as a configuration where an input variable of the flow rate characteristic function is temperature, voltage, or current, and an output variable is a conversion factor or a flow rate value itself. In short, the flow rate characteristic function is only required to be a function used to calculate a flow rate.

Figure 7:
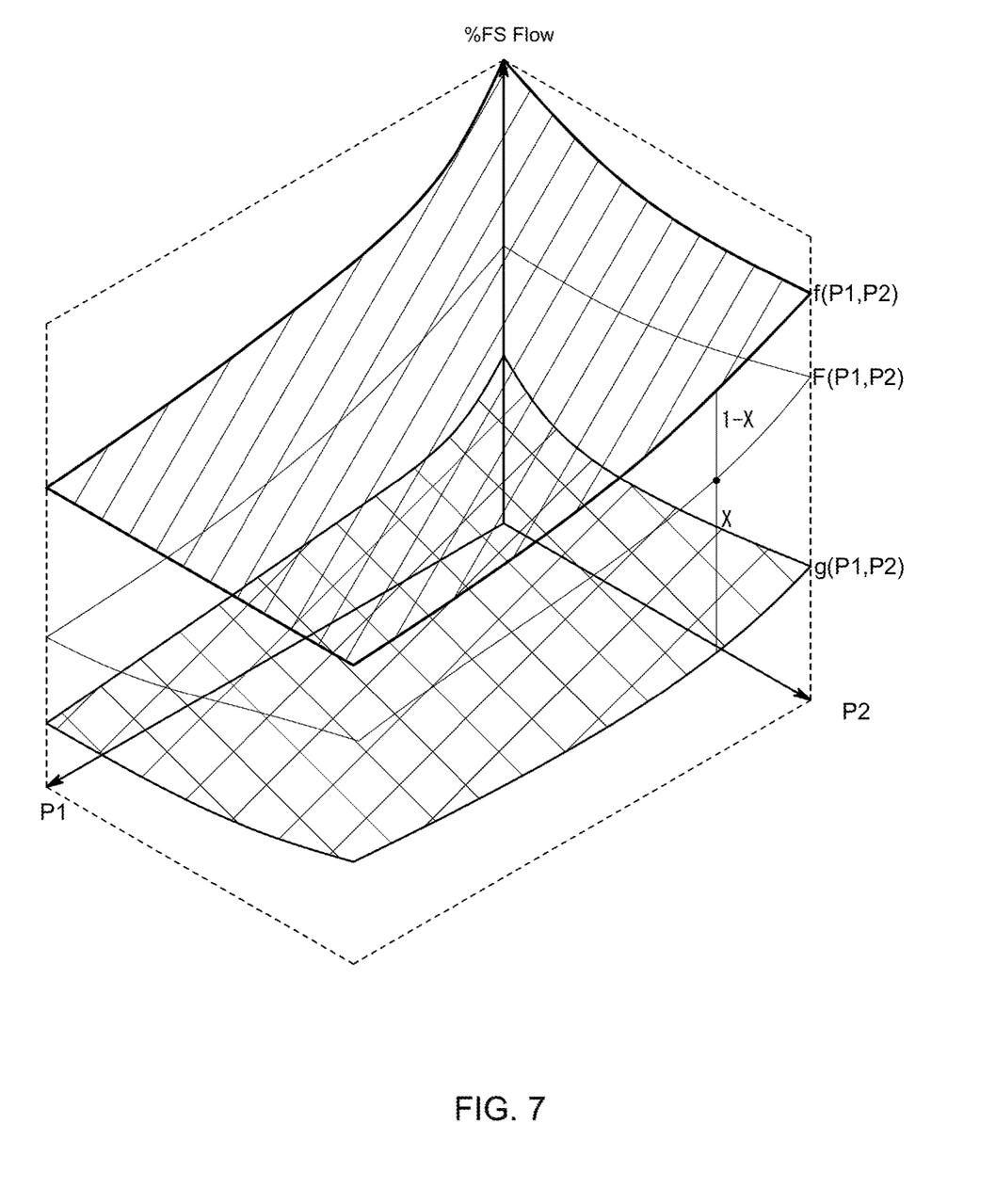
FIG. 7 is a schematic graph illustrating a method for determining weighting in a mixing ratio determination part in a flow rate control device according to another embodiment of the present invention.

Also, the flow rate characteristic function may be defined as a multivariable function including not only the upstream side pressure P1 but also the downstream side pressure P2. Even in the case of such a multivariable function, an actual flow rate characteristic function can be identified on the basis of at least two reference flow rate characteristic functions as in the same manner as that in the above-described embodiment. More specifically, as illustrated in FIG. 7, a first reference flow rate characteristic function f(P1, P2) and a second reference flow rate characteristic function g(P1, P2) represent certain curved surfaces, respectively. An actual flow rate characteristic function F(P1, P2) can be assumed to be present between these curved surfaces. Accordingly, it is only necessary that the above-described actual flow rate characteristic function identification part is configured to, on the basis of sample data at least one point, calculate the internal division ratio between the curved surfaces represented by the respective reference flow rate characteristic functions, and on the basis of the internal division ratio, calculate the actual flow rate characteristic function F(P1, P2).

In the above-described embodiment, as the weighting, the same value is used over the entire input variable area; however, the weighting may be changed for each input variable. In this case, it is only necessary to acquire pieces of sample data in respective areas where the weighting is desired to be changed, and on the basis of each piece of sample data, calculate the weighting.

Further, the actual flow rate characteristic function does not necessarily internally divide the first reference flow rate characteristic function and the second reference flow rate characteristic function but may externally divide them. For example, it is also possible to internally divide the respective reference flow rate characteristic functions in some area, and in the other area, externally divide them.

Also, in the above-described embodiment, the two reference flow rate characteristic functions are mixed to identify the actual flow rate characteristic function; however, in addition, a weighted mean of three or more flow rate characteristic functions may be obtained in accordance with predetermined weighting to identify an actual flow rate characteristic function.

The actual flow rate characteristic function identification part does not only identify the actual flow rate characteristic function using the weighted mean, but may also be configured to identify the actual flow rate characteristic function, which is the flow rate characteristic function when the actual fluid resistance is provided in the flow path, on the basis of multiple flow rate characteristic functions including at least the first reference flow rate characteristic function and the second flow rate characteristic function, and predetermined weighting.

For example, the actual flow rate characteristic function identification part may be configured so as to identify the actual flow rate characteristic function on the basis of a geometric mean taking into consideration of predetermined weighting between the respective reference flow rate characteristic functions.

Further, the type or shape of a reference fluid resistance is not limited to any of those illustrated in FIG. 3, and the actual flow rate characteristic function may be identified from reference flow rate characteristic functions based on various types or shapes.

A function to identify an actual flow rate characteristic function may be added to an existing device using the flow rate characteristic function identification program described in the above-described embodiment or a program storage medium storing the program. As the program storage medium, various media such as a CD, DVD, HDD, and flash memory may be available.

In addition, the pressure sensor may be attached to the component attachment surface of the body in such a way that the pressure sensitive surface of the pressure sensor is parallel to the component attachment surface or vertical to that as above described embodiment.

Besides, various modifications and combinations of the embodiments may be made without departing from the scope of the present invention.

LIST OF REFERENCE CHARACTERS

100: Flow rate control device
10: Flow rate sensor
11: Output mechanism
21: Upstream side pressure sensor
22: Downstream side pressure sensor
3: Laminar flow element (actual fluid resistance)
4: Valve
5: Control mechanism
51: Actual flow rate characteristic function storage part
52: Flow rate calculation part
53: Valve control part
6: Flow rate characteristic function identification device
6A: Actual flow rate characteristic function identification part 61: Reference flow rate characteristic function storage part
62: Reference flow rate characteristic function acquisition part
63: Sample data storage part
64: Mixing ratio determination part
65: Function calculation part

The invention claimed is:

1. A flow rate characteristic function identification method to identify an actual flow rate characteristic function used in a flow rate sensor configured to output an output signal corresponding to a flow rate of fluid flowing through a flow path; an actual fluid resistance element that is actually provided in the flow path; and a flow rate calculation part that is configured to calculate the flow rate on a basis of an output value indicated by the output signal and on a basis of the actual flow rate characteristic function determined by a characteristic of the actual fluid resistance element, the method comprising:

acquiring a first reference flow rate characteristic function and a second reference flow rate characteristic function, wherein
the first reference flow rate characteristic function is determined by a characteristic of a first reference fluid resistance,
the second reference flow rate characteristic function is determined by a characteristic of a second reference fluid resistance;
identifying the actual flow rate characteristic function on a basis of the first reference flow rate characteristic function, the second reference flow rate characteristic function, and predetermined weighting; and
outputting the actual flow rate characteristic function to the flow rate sensor, so that the flow rate sensor calculates the flow rate on the basis of the output value indicated by the output signal and on the basis of the actual flow rate characteristic function determined by the characteristic of the actual fluid resistance element.

2. A flow rate characteristic function identification device adapted to identify an actual flow rate characteristic function used in a flow rate sensor provided with an actual fluid resistance element in a flow path, the flow rate sensor configured to output an output signal corresponding to a flow rate of fluid flowing through the flow path; and calculate the flow rate on a basis of an output value indicated by the output signal and on a basis of the actual flow rate characteristic function determined by a characteristic of the actual fluid resistance element, the flow rate characteristic function identification device comprising:

a reference flow rate characteristic function acquisition part that is configured to acquire a first reference flow rate characteristic function and a second reference flow rate characteristic function, wherein
the first reference flow rate characteristic function is determined by a characteristic of a first reference fluid resistance,
the second reference flow rate characteristic function is determined by a characteristic of a second reference fluid resistance; and
an actual flow rate characteristic function identification part that is configured to identify the actual flow rate characteristic function on a basis of the first reference flow rate characteristic function, the second reference flow rate characteristic function, and predetermined weighting, and output the actual flow rate characteristic function to the flow rate sensor, so that the flow rate sensor calculates the flow rate on the basis of the output value indicated by the output signal and on the basis of the actual flow rate characteristic function determined by the characteristic of the actual fluid resistance element.

3. The flow rate characteristic function identification device according to claim 2, wherein
the actual flow rate characteristic function is a function using the output value as an input variable, and
the actual flow rate characteristic function identification part comprises:
a sample data storage part that is configured to store one or more pieces of sample data each including the output value of the output signal in a case where the actual fluid resistance is provided in the flow path and an actual measured value of an output variable of the actual flow rate characteristic function as a pair, the actual measured value corresponding to the output value;
a mixing ratio determination part that on a basis of the pieces of sample data, is configured to determine the weighting between the first reference flow rate characteristic function and the second reference flow rate characteristic function at each output value; and
a function calculation part that is configured to calculate the actual flow rate characteristic function by obtaining a weighted mean on a basis of the first reference flow rate characteristic function, the second reference flow rate characteristic function, and the weighting determined in the mixing ratio determination part.

4. The flow rate characteristic function identification device according to claim 2, wherein
the actual flow rate characteristic function is a function that an input variable is the output value indicated by the output signal and an output variable is a conversion factor, wherein
the conversion factor is a flow rate correction factor depending on a fluid type.

5. The flow rate sensor which is configured to use the actual flow rate characteristic function identified by the flow rate characteristic function identification device according to claim 2.

6. A flow rate control device comprising:
a valve provided in a flow path;
a flow rate characteristic function identifier configured to:
acquire a first reference flow rate characteristic function determined by a characteristic of a first reference fluid resistance;
acquire a second reference flow rate characteristic function determined by a characteristic of a second reference fluid resistance; and
identify an actual flow rate characteristic function on a basis of the first reference flow rate characteristic function, the second reference flow rate characteristic function, and predetermined weighting;
a flow rate sensor provided with an actual fluid resistance element in the flow path, the flow rate sensor configured to output an output signal corresponding to a flow rate of fluid flowing through the flow path, and calculate the flow rate on a basis of an output value indicated by the output signal and on a basis of the actual flow rate characteristic function determined by a characteristic of the actual fluid resistance element; and
a flow rate controller that is configured to control an opening level of the valve so as to decrease a deviation between a measured flow rate value, which is the flow rate of the fluid outputted from the flow rate sensor, and a set setting flow rate value.

7. A non-volatile memory storing a flow rate characteristic function identification program adapted to identify an actual flow rate characteristic function used in a flow rate sensor provided with an actual fluid resistance element in a flow path, the flow rate sensor configured to output an output signal corresponding to a flow rate of fluid flowing through the flow path; and calculate the flow rate on a basis of an output value indicated by the output signal and on a basis of the actual flow rate characteristic function determined by a characteristic of the actual fluid resistance element, the flow rate characteristic function identification program instructing a computer to fulfill functions as:

a reference flow rate characteristic function acquisition part that is configured to acquire a first reference flow rate characteristic function and a second reference flow rate characteristic function, wherein the first reference flow rate characteristic function is determined by a characteristic of a first reference fluid resistance, the second reference flow rate characteristic function is determined by a characteristic of a second reference fluid resistance; and an actual flow rate characteristic function identification part that is configured to identify the actual flow rate characteristic function on a basis of the first reference flow rate characteristic function, the second reference flow rate characteristic function, and predetermined weighting, and output the actual flow rate characteristic function to the flow rate sensor, so that the flow rate sensor calculates the flow rate on the basis of the output value indicated by the output signal and on the basis of the actual flow rate characteristic function determined by the characteristic of the actual fluid resistance element.

* * * * *